(12) United States Patent
Jessen et al.

(10) Patent No.: US 6,234,099 B1
(45) Date of Patent: May 22, 2001

(54) METHODS AND MEANS TO CONTROL BOAT WAKE

(76) Inventors: Robert H. Jessen, 3649 San Jose Ave., #6, Merced, CA (US) 95348; Michael Murphy, 22981 Sierra Trail, Canyon Lake, CA (US) 92587

( * ) Notice: Subject to any disclaimer, the term of this patent is extended or adjusted under 35 U.S.C. 154(b) by 0 days.

(21) Appl. No.: 09/456,131

(22) Filed: Dec. 7, 1999

(51) Int. Cl.[7] .................................................. B63B 43/06
(52) U.S. Cl. .......................................... 114/125; 114/121
(58) Field of Search ..................................... 114/125, 121

(56) References Cited

U.S. PATENT DOCUMENTS

| | | |
|---|---|---|
| 3,085,535 | 4/1963 | Hunt . |
| 3,186,371 * | 6/1965 | Moore ................................... 114/125 |
| 3,259,100 * | 7/1966 | Kiekhaefer .............................. 440/75 |
| 3,503,358 * | 3/1970 | Moesly .................................. 114/125 |
| 3,559,222 | 2/1971 | Walker . |
| 3,736,608 | 6/1973 | Whitehead . |
| 4,217,845 | 8/1980 | Hood et al. . |
| 4,528,927 | 7/1985 | Iizuka et al. . |
| 4,538,538 | 9/1985 | Carbonel . |
| 5,645,003 | 7/1997 | Grinde . |
| 5,787,835 | 8/1998 | Remnant . |
| 5,979,350 * | 11/1999 | Larson et al. ........................ 114/253 |
| 6,105,527 * | 8/2000 | Lochtefeld et al. .................. 114/125 |

* cited by examiner

Primary Examiner—Sherman Basinger
(74) Attorney, Agent, or Firm—Joseph E. Mueth

(57) ABSTRACT

A water craft including an engine of sufficient thrust to create an enlarged wake at the stern of the boat as the boat moves along the surface of a body of water, and at least one water tight compartment positioned below the waterline having a sealable opening at the stern of the boat below the water line. The compartment extends from the stern to a point forward of the engine. The compartment is adapted to contain liquid water in an amount sufficient to enhance or equalize the size of the boat wake. The opening is adapted to be opened to drain out the water.

12 Claims, 3 Drawing Sheets

METHODS AND MEANS TO CONTROL BOAT WAKE

BACKGROUND OF INVENTION

Various devices have been proposed for modifying boats to enhance the wake of the boat. An enhanced wake increases the thrill and challenge of water skiing or water boarding behind a boat. The greater the wake, the more opportunity for stunts, thrills and competition. The wake of a power boat can be increased by the addition of weight in the stern. One way of lowering the stern of a boat in the water to increase the wake has been the use of weights such as concrete blocks. However, the use of weights is cumbersome and difficult to install and remove, and if a mishap occurs in the handling of weights, the boat may be severely damaged.

U.S. Pat. No. 5,787,835 to Remnant describes a lightweight, portable container located generally above the water line in the stern of a boat in order to add weight to the stern and enhance the wake of the boat. The container is formed from an outer bag and an inner, liquid impermeable bladder positioned within the bag and protected from puncture and abrasion by the bag. The container is carried on a flat surface near the stern of the boat and is held in place by straps. The bladder is filled with water, normally by a garden hose or an electric pump, through one or more nozzles accessed through openings in the bag. A hose is also used to drain the bag either over the side or through the bilge of the boat after the bag has been suitably repositioned or rotated.

Larson et al U.S. Pat. No. 5,979,350 discloses a boat having two ballast tanks positioned at the sides of the stern of the boat and extending toward the center of the stern, the ballast tanks projecting substantially above the water line.

This patent also discloses some information about the present invention which was provided by the present inventors.

SUMMARY OF INVENTION

This invention comprises a novel watercraft including an engine of sufficient thrust to create an enlarged wake at the stern of the boat as the boat moves along the surface of a body of water, and at least one, and normally a pair, of laterally spaced apart water tight compartments positioned below the water line, each having a sealable opening at the stern of the boat below the water line, said each compartment being adapted to contain liquid water in an amount sufficient to enhance or equalize the size of the boat wake, the said opening on each compartment being adapted to be opened to drain out the water while the water craft is in forward motion on a plane.

The present invention is unique in that all of the ballast water is normally carried below the water line and the water tight compartments extend to a point forward of the engine. This lowers the entire boat in the water and does not raise the front of the boat which wastes power, makes the boat more difficult to handle, and restricts visibility. Thus, the boat of the present invention provides an enlarged wake in a more efficient manner, the boat is easier to turn and maneuver, and is capable of higher speeds.

The subject of this patent application is an apparatus and method to enlarge and shape the boat wake behind 16' to 25' boats being used primarily for towable waters ports. The apparatus can be viewed as an assembly made up of four main parts. The first part is a water storage compartment or area, positioned so as to carry water below the water line of the boat, preferably located under the floorboards of the boat, and more preferably composed of two separate areas independent of each other, each of which comprises a water tight area. Each of the water tight compartment(s) is sealed either by the boat construction itself, or by a water tight liner or bladder, preferably rigid or flexible, or in some combination of both boat construction and liner. The water tight compartments extend from the stern of the boat forward and terminate forward of the engine. Thus, the compartment(s) normally extend at least half the length of the boat and usually more on the order of ⅔ or ¾ the length of the boat. The compartments are most preferably made of rigid fiber glass partitions formed integrally with the hull, that is the bottom and sides of the boat. This construction also strengthens the boat. The compartment also preferably contains baffles to prevent sloshing when the compartments are not completely filled with water.

The second part comprises an air vent system for the storage tanks utilizing a simple air equalizing vent, located at the physically highest and most forward part of each sealed compartment area, connected by a length of preferably rubber or suitable flexible hose to a vent through the boat hull well above the water line.

The third part of the apparatus is a storage area water flow control assembly utilizing two mechanically and independently sealable large openings through and on each side of the rear transom of the boat, below the waterline, aligned with the inside bottom of the water storage compartment area, or tank, or tanks, for the purpose of flooding or filling, as well as draining or emptying the water storage area, or tank, or tanks.

The fourth part of the apparatus of this invention is a means to allow the boat occupants to remotely control the storage area water flow control assembly affecting the amount of water flowing into or out of the water storage area.

THE DRAWINGS

Turning to the drawings.

DESCRIPTION OF THE PREFERRED EMBODIMENT

Figure 1:
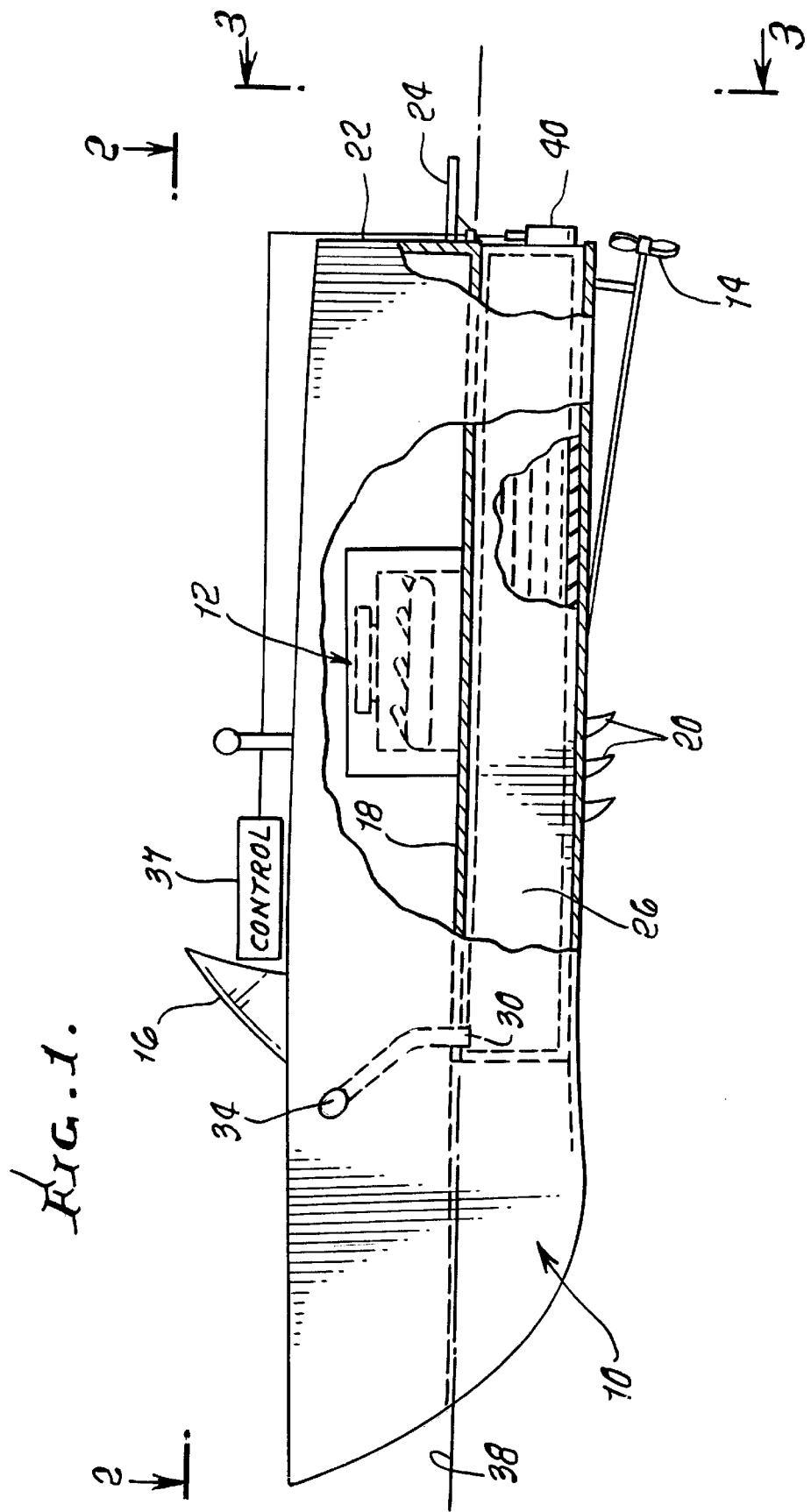
FIG. 1 is a side view, in partial breakaway, showing a boat equipped with the wake enlarging and equalizing apparatus of this invention.
Figure 2:
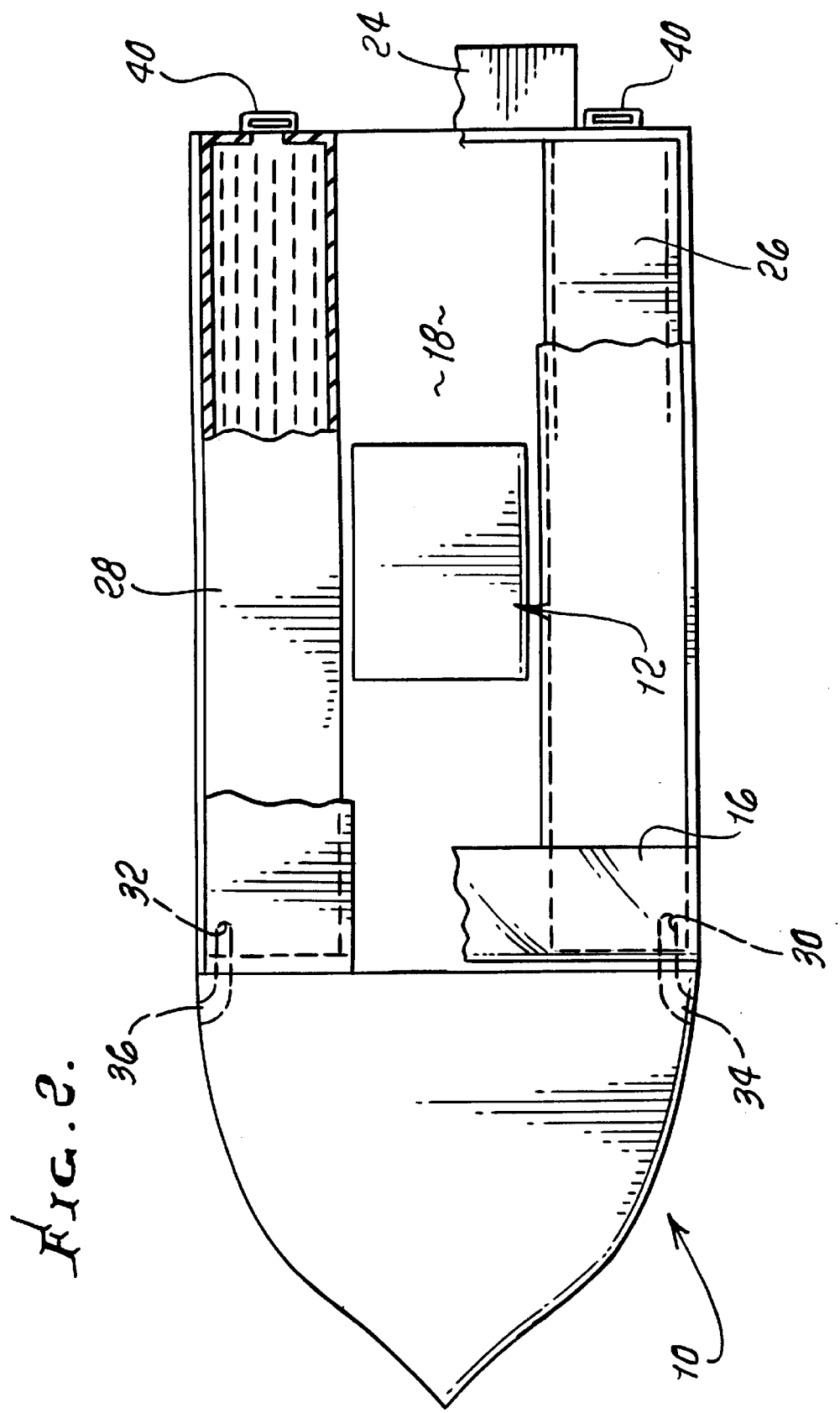
FIG. 2 is a top view in partial breakaway taken from the line 2—2 in FIG. 1.
Figure 3:
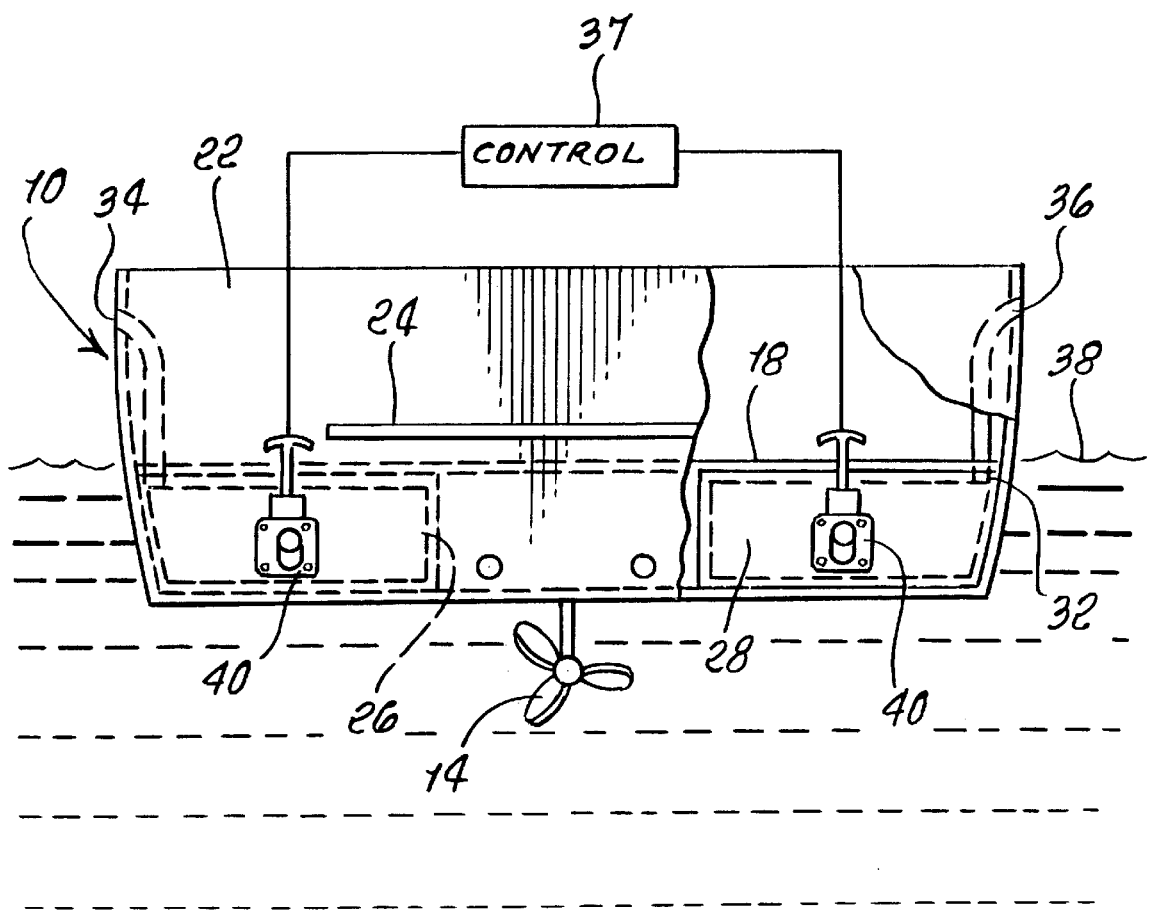
FIG. 3 is a rear view in partial breakaway taken from the line 3—3 in FIG. 1.

The subject of this patent application is more generally described with reference to the preferred embodiment as follows:

Turning to the drawings.

The subject of this patent application is an apparatus and method to enlarge and/or equalize the size of the boat wake typically in 16' to 25' power boats used for towable water sports, such as water skiing and water boarding. The hull 10 of the power boat is provided with a conventional engine located forwardly of the stern with cover 12, screw 14, windshield 16, floorboard 18, rudder 20, and transom 22 provided with swim step 24. The means for storage of water, under the floorboard 18 of the boat, is composed of two separate independent water tight compartments 26 and 28, formed and sealed by integral formation within the boat construction itself. Alternatively, a waterproof liner or bladder can be used which is held snugly in place by partitions and/or bulkheads. Any combination of both boat construction and waterproof liner can also be used. The water tight compartment can be made of Fiberglass, rubber, plastic, chemically lined, metal or some combination, and, in shape, conforming to area opening at the stern below the waterline.

A means for the venting of air is provided in communication with the compartments 26, 28. Normally, the simplest means for equalizing the air is a vent, 30, 32 located at the physically highest and most forward part of the compartments, 26, 28 for storage of water. The vents 30, 32, communicate via hose means 34, 36, for providing air to the means for passing air through the boat hull, at a point well above the water line. Normally an air vent hose barb is present on the water compartment and is made of metal or plastic. The air vent hose itself is usually made of rubber, plastic or metal. The external air vent passing through the boat hull is metal or plastic and is round or hollow in shape. The vents 30, 32 are preferably provided with air whistles which emit an audible sound as the compartments are filled with water. When the compartments reach the full stage with water, all of the air in the compartment has been displaced and the whistling stops, signaling that the filling water should be shut off. The whistle sounding device eliminates the need for wiring and gauges.

The means for controlling the amount of water flowing to or from the water compartments 26, 28, allow large amounts of water to enter or exit the water compartments, passing through and on each side of the rear transom 22 of the boat, below the waterline 38, for the purpose of flooding or filling, as well as draining or emptying the compartments 26, 28, of water. The boat occupants can remotely control the amount of water flowing into or out of the compartments 26, 28 via control 37. The compartment 26,28 water flow is controlled by sealable large opening device 40, made of fiberglass, metal, plastic, hard rubber or combination, and is rectangular, oval, or any shape. A gate valve is preferred.

The means for connecting control 37 to gate valve 40 usually includes a metal flange-like connection attached to the gate valve 40. When installed, one person in the boat can easily, at any time, remotely open or close the large underwater openings located through the rear transom 22 of the boat just below the water line 38, causing water to quickly flood into the compartments 26, 28 at a rate of flow controlled by the operator, and at the same time, if desired, vary the amount of water flowing to each of the compartments, independently filling or partially filling each of them to the final desired amounts of water. The control 37 inside boat attached to the gate valve 40 is operated by either electrical, mechanical, manual, or hydraulic means and employs switch lever, valve, cable control, or combination.

While the drawings depict an inboard motor boat, the invention is also readily adapted to stern drive boats.

This method allows the operator to individually adjust the compartments water's final weight and left to right balance, providing a quick and easy means of fine adjustment to the resulting overall height, size, and shape of the boat wake. For quickly emptying the water compartments, an individual in the boat, at any time can open the sealable water openings, allowing the water to quickly flow out of the compartments while the boat is in forward motion on plane. The sealable water openings may then be closed, returning the boat to normal operation without the extra water weight and the accompanying enlarged boat wake, resuming the boat's normal wake characteristics.

The empty compartments contain air which provide increased buoyance not normally present.

Having fully described the invention, the following claims are intended to particularly point out and distinctly claim the invention.

What is claimed is:

1. A water craft including an inboard engine of sufficient thrust to create an enlarged wake at the stern of the boat as the boat moves along the surface of a body of water, and at least one water tight compartment positioned below the water line having a sealable opening at the stern of the boat below the water line, said compartment being adapted to contain liquid water in an amount sufficient to enhance or equalize the size of the boat wake, the said opening on said compartment being adapted to be opened to drain out the water at the rear of the water craft while the water craft is in forward motion on a plane, said inboard engine being located forwardly of the stern and said compartment extending at its rear end from in proximity to the stern of the water craft and terminating at its front end a point forward of the engine.

2. The water craft of claim 1 wherein the water craft is a 16' to 25' boat used primarily for towable water sports.

3. The water craft of claim 1 wherein the watertight compartment is a single compartment.

4. The water craft of claim 1 wherein the watertight compartment is a pair of spaced apart compartments.

5. The water craft of claim 1 wherein said watertight compartment comprises the inside of the water craft construction.

6. The water craft of claim 1 wherein the watertight compartment comprises a bladder.

7. The water craft of claim 1 wherein the water craft has a floorboard and said compartment is located within said hull and under said floorboard.

8. The water craft of claim 1 including an air vent system for said compartment located at the physically highest and most forward part of said compartment.

9. The water craft of claim 1 wherein said system further includes a length of preferably rubber or suitable flexible hose connected to a vent through the boat hull above the water line.

10. The water craft of claim 1 wherein said compartment further comprises a flow control assembly which includes a sealable opening through the rear transom of the boat, said opening being adapted for flooding or filling, as well as draining or emptying said compartment.

11. The water craft of claim 1 wherein said compartment includes a flow control assembly utilizing a mechanically and independently sealable large opening through the rear transom of the boat below the waterline, aligned with the inside bottom of the said compartment, for the purpose of flooding or filling, as well as draining or emptying said compartment.

12. The water craft of claim 11 including a means to allow boat occupants to remotely control the flow control assembly, affecting the amount of water flowing into or out of said compartment.

* * * * *